United States Patent [19]

Kircher et al.

[11] Patent Number: 5,465,803
[45] Date of Patent: Nov. 14, 1995

[54] HOOD FOR A MOBILE EXCAVATOR

[75] Inventors: Günter Kircher, Tiefenbronn; Heinz-Peter Küsters, Vaihingen, both of Germany

[73] Assignee: Dr. Ing. h.c.F. Porsche AG

[21] Appl. No.: 128,577

[22] Filed: Sep. 30, 1993

[30] Foreign Application Priority Data

Sep. 30, 1992 [DE] Germany .................. 42 32 698.2

[51] Int. Cl.⁶ ................................................ B62D 25/10
[52] U.S. Cl. .................. 180/69.21; 180/69.2; 180/89.12
[58] Field of Search ............................. 180/69.2, 69.21, 180/69.25, 89.12, 89.17; 296/76

[56] References Cited

U.S. PATENT DOCUMENTS

| 4,263,978 | 4/1981 | Jackson | 16/80 |
| 4,312,418 | 1/1982 | Rittman | 180/685 |
| 4,566,552 | 1/1986 | Hoffmann et al. | 180/69.21 |

FOREIGN PATENT DOCUMENTS

| 2036599 | 5/1992 | Canada | 180/69.2 |
| 1131079 | 2/1957 | France . | |
| 2581950 | 11/1986 | France | 180/69.2 |
| 915781 | 7/1954 | Germany . | |
| 2515955 | 1/1978 | Germany . | |

OTHER PUBLICATIONS

Product Engineering (Jun. 8, 1970) "Unique linkage produces precise straight-line motion".

Primary Examiner—Anne Marie Boehler
Attorney, Agent, or Firm—Evenson McKeown Edwards & Lenahan

[57] ABSTRACT

A hood assembly for a mobile excavator has a lever arrangement by means of which the hood which—with respect to the driving direction—is arranged behind the driver's cab, can be swivelled up. The hood has a first projecting end wall which is directed toward the driver's cab and which has a set-off area with respect to a second set-back end wall. Both end walls have a course along oblique planes which extend at an acute angle with respect to the body and which are arranged approximately in parallel to one another. Outer side levers and a center lever, which is arranged in-between, of the lever arrangement form a four-bar mechanism with the hood by way of which the lower boundary edges of the end walls during the swivelling in the overlapping area with the driver's cab and a tank can be moved within a gap as well as along a front wall of the tank on a straight course along the planes.

11 Claims, 4 Drawing Sheets

HOOD FOR A MOBILE EXCAVATOR

BACKGROUND AND SUMMARY OF THE INVENTION

This invention relates to a hood assembly for a mobile excavator.

For the swivelling of hoods on vehicles, lever arrangements are known (German Patent Document DE-PS 915781) which cause an opening and closing of a hollow space in the vehicle body by way of the hood.

It is an object of the invention to provide a hood for a mobile excavator which, for the swivelling by way of the lever arrangement, carries out a precisely coordinated movement in a defined swivel area.

According to the invention, this object is achieved by providing a hood assembly for a mobile excavator comprising:

a hood arranged behind an excavator driver's cab, as considered in a forward excavator driving direction, said hood having a first forward end wall which faces the driver's cab and a second forward end wall set back rearwardly of the first forward end wall to form an offset area to accommodate an offset section of the driver's cab, said first and second forward end walls being disposed in respective substantially parallel planes extending obliquely toward the rear at an acute angle with respect to the local horizontal when said hood is in a closed in-use position, a pair of exterior side levers and a center lever pivotally connected to the hood and to relatively fixed excavator parts and serving to controllably support the hood for movement between a closed position and an open position, said levers and said hood together forming a four bar linkage by way of which lower boundary edges of the first and second forward end walls during the swivelling in the overlapping area with the driver's cab and a tank can be moved within a gap as well as along a front wall of the tank on a straight course along the planes.

The principal advantages achieved by means of the invention are that the hood, which has a set off in the area facing the driver's cab, is arranged so that during the swivelling in the case of a movement, it is free of the driver's cab and of the fuel tank to be covered. The reason is that one end wall of the hood is arranged in an area in a gap between the driver's cab and a hydraulic-oil tank and the additional connecting end wall is arranged to cover a fuel tank.

So that, on the one hand, during the swivelling, a lower hood edge of the end wall will not be wedged in the gap and, on the other hand, the additional hood edge of the other end wall will not strike against the fuel tank, a straight-line motion will take place in a first swivel range of the hood which will be followed by a curved swivel motion of the hood or the hood edge.

For achieving corresponding guided swivel motions, a special lever arrangement is provided which consists of two outer side levers and one center lever arranged in-between which is connected with a pneumatic spring. Together, the levers form a four-bar mechanism, the hood representing the connecting rod.

The side levers are arranged directly adjacent to the interior surface of the hood and above the hydraulic-oil tank and are placed by means of a bent rearward end against a bearing bracket of the vehicle body. The center lever extends approximately as an extension of the side levers and is held in a bearing bracket behind the bearing brackets of the side levers. Between the bearing brackets of the side levers and the bearing bracket of the center lever, the pneumatic spring is supported on the vehicle body.

The pneumatic spring is designed in such a manner that, in a first swivel range, the hood will lift automatically. In an intermediate swivel range, the center position of the center of gravity is overcome manually by way of the pivot of the center lever on the vehicle body. In the case of the end swivel range, the pneumatic spring promotes the hood movement to such an extent that a slow damped lowering of the hood takes place over the rearward structure of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
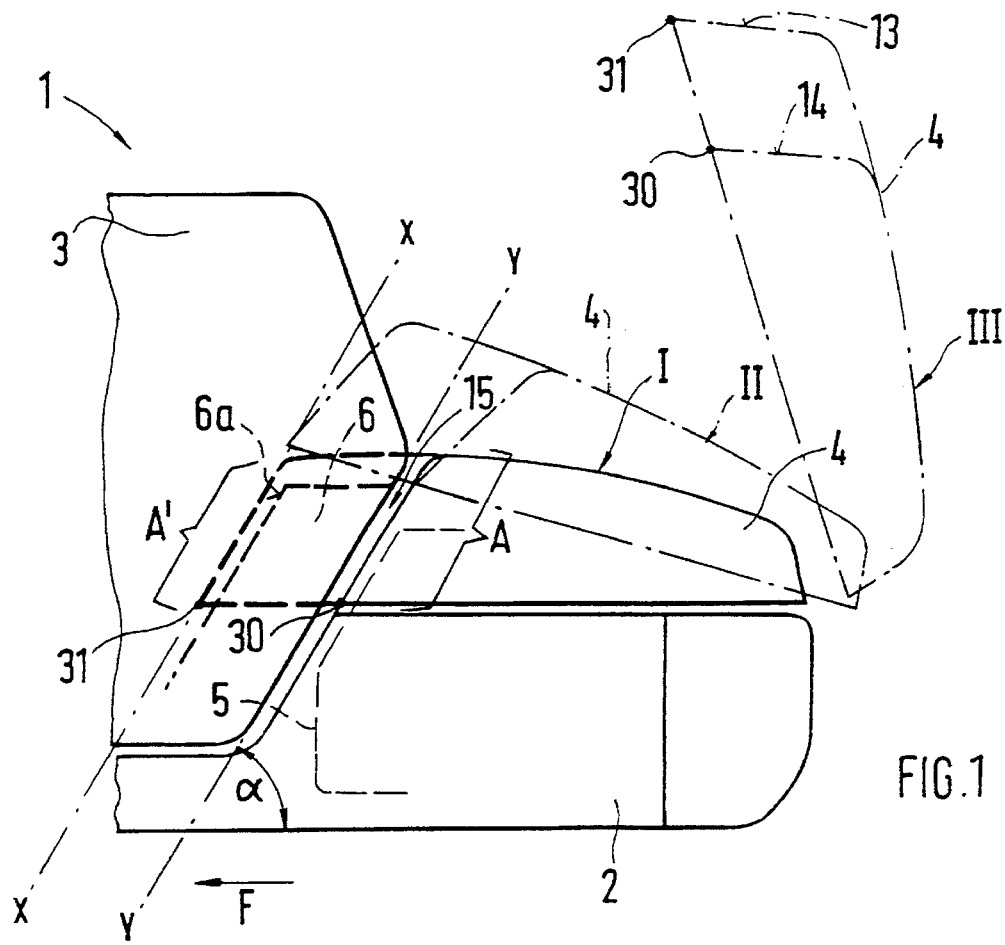
FIG. 1 is a schematic lateral view of mobile excavator with a driver's cab and a hood assembly constructed according to a preferred embodiment of the invention.
Figure 2:
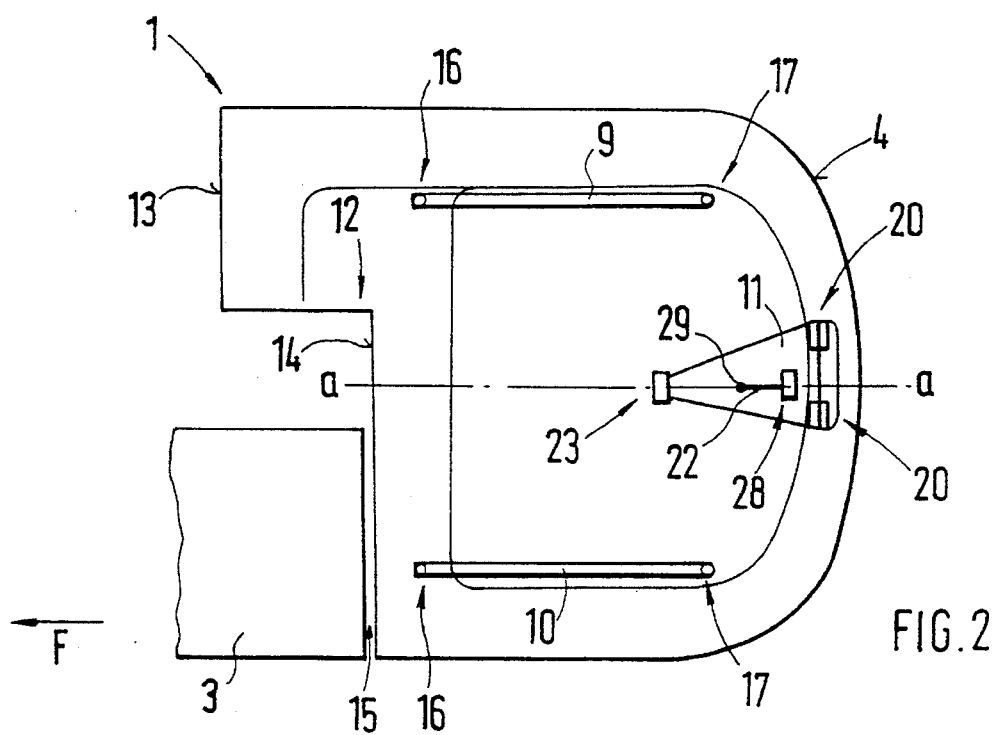
FIG. 2 is a schematic top view with respect to FIG. 1, schematically depicting the lever arrangement.
Figure 3:
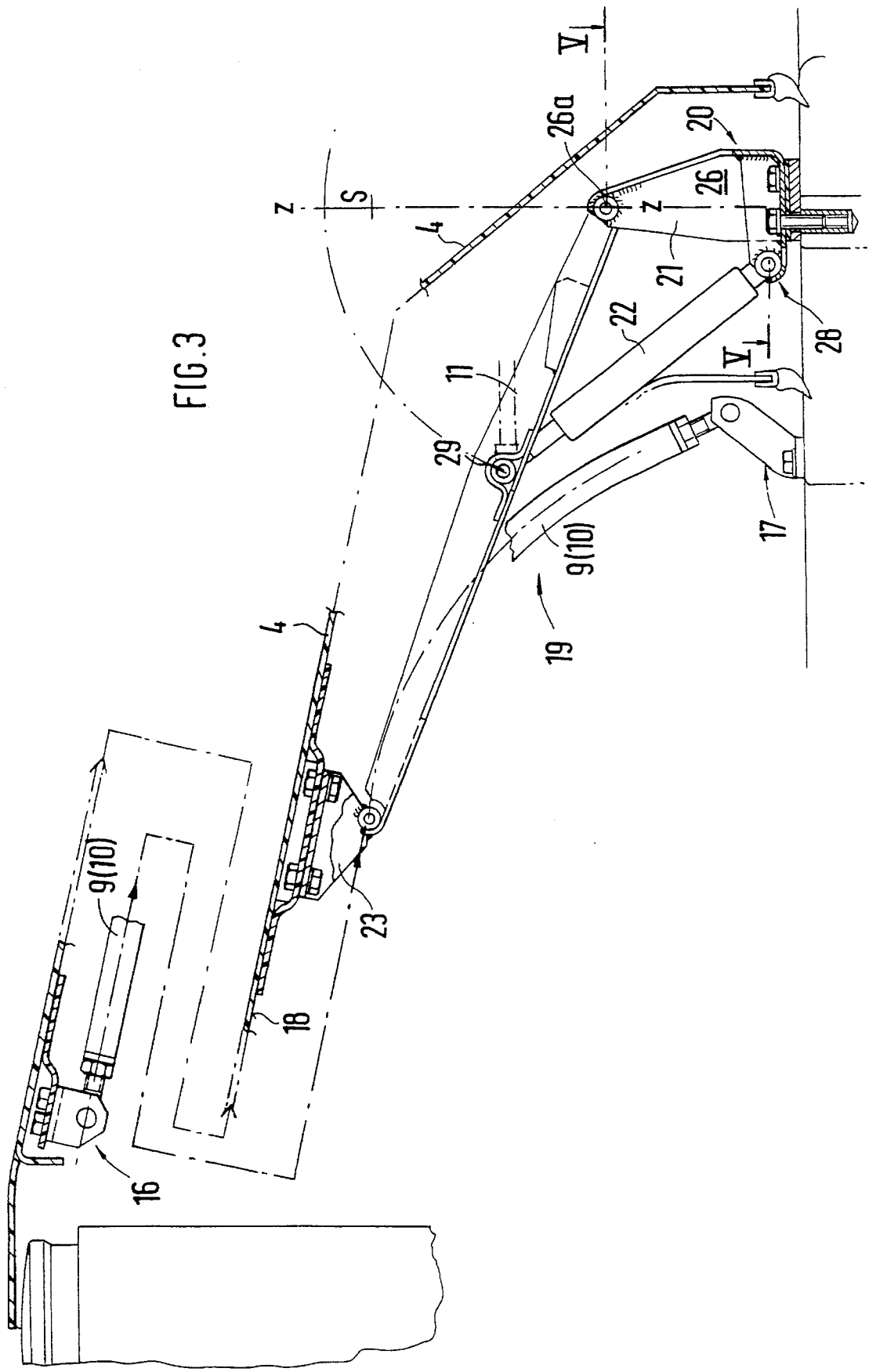
FIG. 3 is a schematic lateral view of the lever arrangement of the hood assembly of FIGS. 1 and 2.
Figure 4:
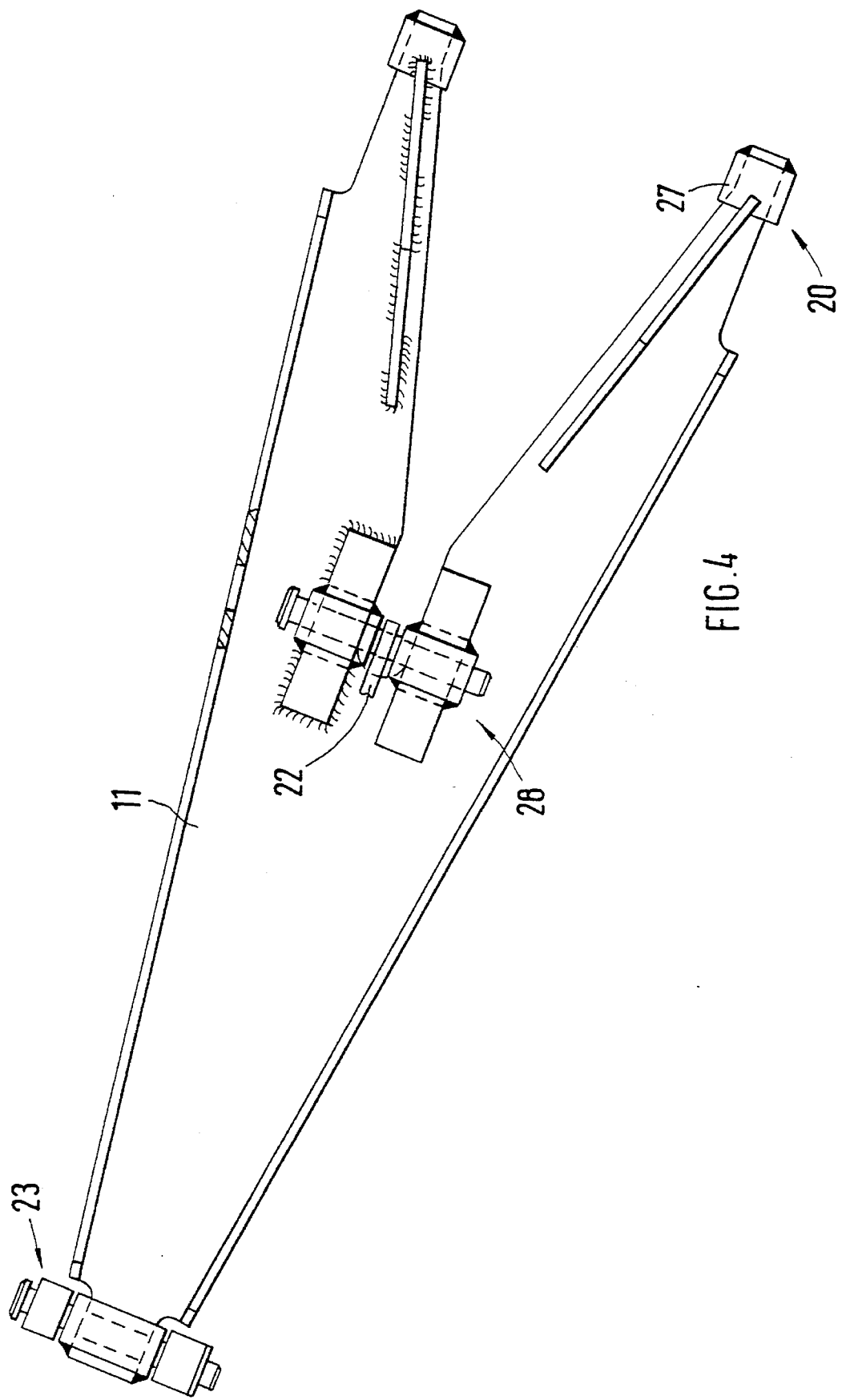
FIG. 4 is a top view of the center lever according to FIG. 3.
Figure 5:
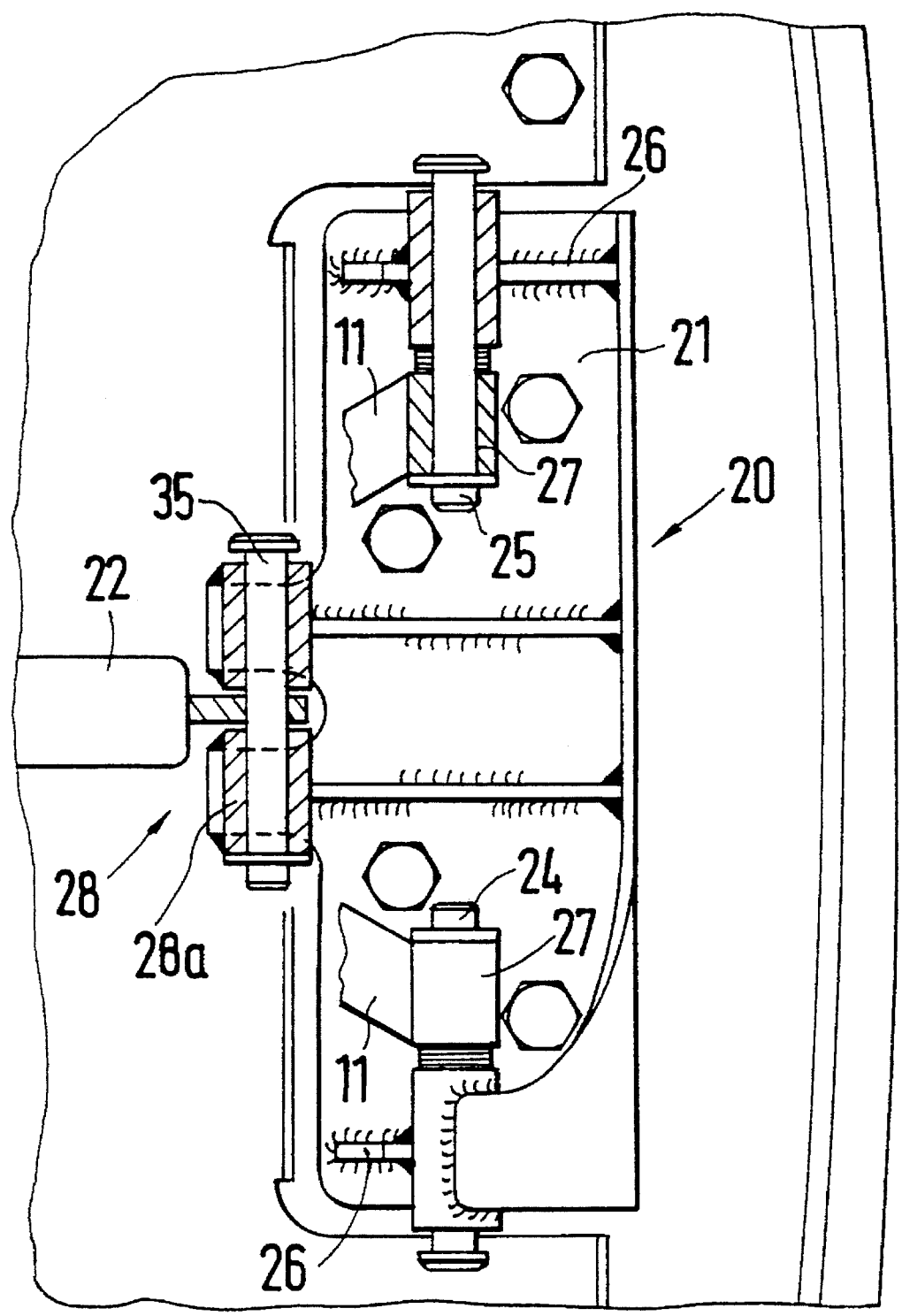
FIG. 5 is a sectional view of a common bearing bracket on the vehicle body according to Line V—V of FIG. 3 for a pneumatic spring and the center lever.

As illustrated schematically in FIG. 1, a mobile excavator 1 has a vehicle body comprising a basic body 2, a driver's cab 3, and a hood 4. This hood 4 closes off a space in the basic body 2 which, among other things, houses a hydraulic-oil tank 5 and a fuel tank 6.

By way of a lever arrangement consisting of two side levers 9 and 10 as well as one center lever 11, the hood 4 is pivotally connected to the basic body 2 of the vehicle body. The side levers 9 and 10, together with the center lever 11 and the hood 4 as the connecting rod, form a four-bar mechanism.

On its end wall facing the driver's cab 3, the hood has a setoff area 12 in such a manner that the one end wall 13 of one side of the excavator 1—with respect to the driving direction F—is arranged in front of another end wall 14 of the other side. This construction of the end walls 13 and 14 is caused by the arrangement of the hydraulic oil tank 5 and of the fuel tank 6 in the basic body 2.

As illustrated in detail in FIG. 1, the oil tank 5 is arranged directly adjacent and behind the driver's cab 3. One end wall 14 is situated in a remaining gap 15 in the closed condition of the hood 4. At the same time, the other end wall 13 reaches over the fuel tank 6. The end walls 13 and 14 extend in an oblique plane x—x and y—y which are arranged in parallel with respect to one another and are set at an acute angle α with respect to the basic body 2.

The two side levers 9 and 10 are arranged in parallel with respect to one another and are swivellably held on the one side on the hood 4 on a bearing bracket 16 and, on the other side, on the basic body 2 in a bearing bracket 17. The side levers 9 and 10 extend close to the inner hood contour 18 above the hydraulic tank 5 and are bent in an area 19 in the direction of the bearing bracket 17.

The center lever 11 is swivellably held in a console 20 which forms a common bearing bracket 21 with the center lever 11 and the pneumatic spring 22, and is pivotally connected on the hood 4 by way of a bearing bracket 23, the pneumatic spring 22 being supported on the center lever in the bearing 29.

The bearing bracket 21 comprises receiving pins 24, 25 which are opposite one another with the same axes and which are held in perpendicular webs 26 and form bearings 27 for the center lever 11. The pneumatic spring 22 is held in a bearing 28 which is arranged below the bearing pins 24, 25.

As illustrated in FIG. 1 by means of the hood shown in three positions I, II, III, targeted swivel motions of the hood 4 for the opening and closing are possible by way of the lever arrangement of the side levers 9, 10, the center levers 11, and the connecting rod (hood 4).

One lower boundary edge 30 of the end wall 14 extends into the gap 15; the other lower boundary edge 31 is situated outside, that is, in front of the fuel tank 6. A swivelling of the hood 4 must take place in such a manner that the boundary edge 30 does not strike against the driver's cab 3, and the boundary edge 31 does not strike against the front wall 6a of the fuel tank 6. For this purpose, the levers 9, 10 and 11 are designed such that, in a swivel range A and A', the boundary edge 30 carries out an almost linear swivel motion and a curved swivel motion will follow. During the closing, the swivel motions of the hood 4 take place in a corresponding manner.

Interacting with the lever arrangement, the pneumatic spring 22 is inclined with respect to the hood 4 in such a manner that in a first swivel range A, the hood 4 can be lifted automatically. In an intermediate swivel range that follows, a manual lifting and swivelling of the hood 4 takes place to the center position; that is, when the center of gravity S of the hood 4 is above the pivot 26a of the center lever 11. An end swivel range follows in which the pneumatic spring 22 dampens a lowering of the hood 4 over the rear structure of the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A mobile excavator assembly comprising:
   a hood arranged behind an excavator driver's cab of an excavator body, as considered in a forward excavator driving direction, said hood having a first forward end wall which faces the driver's cab and a second forward end wall set back rearwardly of the first forward end wall to form an offset area to accommodate an offset section of the driver's cab, said first and second forward end walls being disposed in respective substantially parallel planes extending obliquely toward the rear at an acute angle with respect to the local horizontal when said hood is in a closed in-use position,
   a pair of exterior side levers and a center lever pivotally connected to the hood and to relatively fixed excavator parts and serving to controllably support the hood for movement between a closed position and an open position, said levers and said hood together forming a four bar linkage by way of which lower boundary edges of the first and second forward end walls during the swivelling in an overlapping area with the driver's cab and a tank can be moved within a gap as well as along a front wall of the tank on a straight course along the planes.

2. An assembly according to claim 1, wherein the two side levers are arranged in parallel with respect to one another and a lever section situated on top has a course close to the inner hood contour, a lower end facing away from the hood having a bent area in a direction of the excavator body and being pivotally connected in a bearing bracket, and the center lever situated in-between extending approximately in one plane with the section of the outer lever situated on top and, spaced away from the bearing bracket, the outer lever being pivotally connected in another bearing bracket.

3. An assembly according to claim 1, wherein the center lever is connected with a pneumatic spring which is swivellably supported on the excavator body in front of a bearing of the center lever and which holds the hood for the swivelling in a power-assisting manner up to a position at which the center of gravity (S) of the hood is in the same perpendicular plane with the bearing center of the center lever.

4. An assembly according to claim 2, wherein the center lever is connected with a pneumatic spring which is swivellably supported on the excavator body in front of the bearing of the center lever and which holds the hood for the swivelling in a power-assisting manner up to a position at which the center of gravity (S) of the hood is in the same perpendicular plane with the bearing center of the center lever.

5. An assembly according to claim 3, wherein the pneumatic spring is held on the excavator body between the bearing brackets of the side levers and the bearing bracket of the center lever and is pivotally mounted at a bearing in a perpendicular longitudinal center plane of the center lever.

6. An assembly according to claim 4, wherein the pneumatic spring is held on the excavator body between the bearing brackets of the side levers and the bearing bracket of the center lever and is pivotally mounted at a bearing in a perpendicular longitudinal center plane of the center lever.

7. An assembly according to claim 3, wherein the pneumatic spring is dimensioned and pivotally connected on the excavator body as well as on the hood in such a manner that, in a first swivel range, the hood can be lifted automatically, in an intermediate swivel range, a manual swivelling takes place to the center position of the center of gravity by way of the pivot of the center lever, and in an end swivel range, the spring dampens a lowering of the hood over the rear structure of the excavator.

8. An assembly according to claim 6, wherein the pneumatic spring is dimensioned and pivotally connected on the excavator body as well as on the hood in such a manner that, in a first swivel range, the hood can be lifted automatically, in an intermediate swivel range, a manual swivelling takes place to the center position of the center of gravity by way of the pivot of the center lever, and in an end swivel range, the spring dampens a lowering of the hood over the rear structure of the excavator.

9. An assembly according to claim 3, wherein the bearing block for the pneumatic spring and for the center lever comprises a common console which comprises receiving pins, which are opposite one another with the same axes, for the bearings for the center lever which are arranged at a distance from one another, and between these two bearings, the pneumatic spring is swivellably held on a pin which is held by the console and which is supported in two bearing jaws.

10. An assembly according to claim 6, wherein the bearing block for the pneumatic spring and for the center lever comprises a common console which comprises receiving pins, which are opposite one another with the same axes, for the bearings for the center lever which are arranged at a distance from one another, and between these two bearings, the pneumatic spring is swivellably held on a pin which is held by the console and which is supported in two bearing jaws.

11. An assembly according to claim 8, wherein the bearing block for the pneumatic spring and for the center lever comprises a common console which comprises receiving pins, which are opposite one another with the same axes, for the bearings for the center lever which are arranged at a distance from one another, and between these two bearings, the pneumatic spring is swivellably held on a pin which is held by the console and which is supported in two bearing jaws.

\* \* \* \* \*